US010715516B1

(12) United States Patent
Colletta et al.

(10) Patent No.: US 10,715,516 B1
(45) Date of Patent: Jul. 14, 2020

(54) TIME-SERIES DATABASE USER AUTHENTICATION AND ACCESS CONTROL

(71) Applicant: FMR LLC, Boston, MA (US)

(72) Inventors: Edward Colletta, Carle Place, NY (US); Mrinal Vala, Kendall Park, NJ (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/556,834

(22) Filed: Aug. 30, 2019

(51) Int. Cl.
*G06F 12/14* (2006.01)
*H04L 9/32* (2006.01)
*G06F 16/25* (2019.01)
*H04L 29/06* (2006.01)
*G06F 16/953* (2019.01)

(52) U.S. Cl.
CPC .......... *H04L 63/083* (2013.01); *G06F 16/953* (2019.01); *H04L 63/102* (2013.01)

(58) Field of Classification Search
CPC .... H04L 63/083; H04L 63/102; G06F 16/953
See application file for complete search history.

(56) References Cited

U.S. PATENT DOCUMENTS

| 10,298,623 | B2* | 5/2019 | Bouthemy | H04L 65/1006 |
| 2003/0154406 | A1* | 8/2003 | Honarvar | G06Q 10/10 726/10 |
| 2003/0191703 | A1* | 10/2003 | Chen | G06Q 40/02 705/36 R |
| 2004/0093515 | A1* | 5/2004 | Reeves, Jr. | H04L 63/0807 726/10 |
| 2006/0202037 | A1* | 9/2006 | Gunawardena | G16H 15/00 235/462.15 |
| 2007/0208744 | A1* | 9/2007 | Krishnaprasad | G06F 21/6227 |
| 2007/0208746 | A1* | 9/2007 | Koide | G06F 21/6218 |
| 2007/0209080 | A1* | 9/2007 | Ture | G06F 21/53 726/28 |

(Continued)

OTHER PUBLICATIONS

Antova, Lyublena, et al. "Datometry Hyper-Q: Bridging the gap between real-time and historical analytics." Proceedings of the 2016 International Conference on Management of Data. ACM, 2016. (Year: 2016).*

(Continued)

*Primary Examiner* — Michael Simitoski
(74) *Attorney, Agent, or Firm* — Proskauer Rose LLP (57) ABSTRACT

Methods and apparatuses are described for time-series database user authentication and access control. A server computing device receives a request from a remote computing device to access a time-series database coupled to the server computing device, wherein the request includes one or more authentication credentials associated with the remote computing device. The server computing device validates the one or more authentication credentials associated with the remote computing device. The server computing device connects to an access control layer associated with the time-series database. The access control layer authorizes the remote computing device to access data in the time-series database based upon an access profile associated with the validated authentication credentials. The server computing device retrieves data from the time-series database in response to the request.

22 Claims, 5 Drawing Sheets

(56) References Cited

U.S. PATENT DOCUMENTS

| | | | |
|---|---|---|---|
| 2007/0220268 A1* | 9/2007 | Krishnaprasad | H04L 63/0815 713/182 |
| 2008/0157931 A1* | 7/2008 | Winkler | G06Q 10/06 340/10.6 |
| 2008/0196020 A1* | 8/2008 | Clinton | G06F 8/65 717/172 |
| 2009/0063490 A1* | 3/2009 | Fuerst | G06F 21/6227 |
| 2012/0278303 A1* | 11/2012 | Krishnaprasad | H04L 63/0815 707/711 |
| 2012/0304307 A1* | 11/2012 | Ramesh | G06Q 10/06 726/28 |
| 2013/0139196 A1* | 5/2013 | Sokolov | H04N 21/25833 725/25 |
| 2013/0212618 A1* | 8/2013 | Schultz | H04N 21/482 725/30 |
| 2014/0013396 A1* | 1/2014 | Field-Eliot | H04L 63/0807 726/4 |
| 2014/0149466 A1* | 5/2014 | Sato | G06F 16/21 707/803 |
| 2016/0314211 A1* | 10/2016 | Kerai | G06F 21/45 |
| 2017/0126506 A1* | 5/2017 | Padala | G06F 9/5083 |
| 2017/0293472 A1* | 10/2017 | Catania | G06F 8/70 |
| 2017/0331829 A1 | 11/2017 | Lander et al. | |
| 2018/0075231 A1 | 3/2018 | Subramanian et al. | |
| 2018/0083941 A1 | 3/2018 | Thakkar | |
| 2018/0316764 A1* | 11/2018 | Ferreira Gomes | H04W 4/38 |
| 2018/0329916 A1* | 11/2018 | Waas | G06F 16/252 |
| 2019/0036906 A1* | 1/2019 | Biyani | H04L 63/0807 |
| 2019/0095498 A1* | 3/2019 | Srinivasan | G06F 9/5072 |
| 2019/0238467 A1* | 8/2019 | Guan | H04L 41/0681 |

OTHER PUBLICATIONS

Jones, M. B., et al. "JSON Web Token (JWT) profile for OAuth 2.0 client authentication and authorization Grants." (2013). (Year: 2013).*

Ethelbert, Obinna et al., "A JSON Token-Based Authentication and Access Management Schema for Cloud SaaS Applications," 2017 IEEE 5th International Conference on Future Internet of Things and Cloud (FiCloud), Prague, Czech Rep., 6 pages.

* cited by examiner

TIME-SERIES DATABASE USER AUTHENTICATION AND ACCESS CONTROL

TECHNICAL FIELD

This application relates generally to methods and apparatuses, including computer program products, for time-series database user authentication and access control.

BACKGROUND

For certain types of large-scale computing applications, such as complex trading platforms that rely on time series data and where fractions of a second can have major impact on a transaction, it is important to utilize database technology that can perform very fast and low-latency transaction processing. An example of such database technology is a time-series database (e.g., kdb+ available from Kx Systems of Palo Alto, Calif.) that can be optimized for receiving, processing, and storing large amounts of structured data in real time.

In most enterprise-wide implementations, data within a time-series database is typically accessed by a wide variety of computing systems and processes (including client computing devices logging in from external networks). However, due to the emphasis on speed and processing performance, these types of databases generally lack robust authentication and access control mechanisms. Also, because the data contained in a time-series database can be sensitive and proprietary, the lack of sufficient authentication and access control could lead to unauthorized access and compromise of the database.

SUMMARY

Therefore, what is needed are methods and systems for implementing robust, multi-faceted authentication and access control to time-series database technology, particularly when used in conjunction with an application platform that requires high speed, low-latency performance. The technology described here advantageously provides a flexible mechanism for providing authorized, secure, device-specific access to data in a time-series database without compromising the computing performance of the underlying database. The methods and systems described herein utilize an intermediate authentication process between the computing device requesting data and the time-series database, to ensure that an access request is authorized—both from a device-specific and a data-specific perspective.

The invention, in one aspect, features a system for time-series database user authentication and access control. The system includes a server computing device comprising a memory for storing computer-executable instructions and a processor that executes the computer-executable instructions. The server computing device receives a request from a remote computing device to access a time-series database coupled to the server computing device, wherein the request includes one or more authentication credentials associated with the remote computing device. The server computing device validates the one or more authentication credentials associated with the remote computing device. The server computing device connects to an access control layer associated with the time-series database. The access control layer authorizes the remote computing device to access data in the time-series database based upon an access profile associated with the validated authentication credentials. The server computing device retrieves data from the time-series database in response to the request.

The invention, in another aspect, features a computerized method of time-series database user authentication and access control. A server computing device receives a request from a remote computing device to access a time-series database coupled to the server computing device, wherein the request includes one or more authentication credentials associated with the remote computing device. The server computing device validates the one or more authentication credentials associated with the remote computing device. The server computing device connects to an access control layer associated with the time-series database. The access control layer authorizes the remote computing device to access data in the time-series database based upon an access profile associated with the validated authentication credentials. The server computing device retrieves data from the time-series database in response to the request.

Any of the above aspects can include one or more of the following features. In some embodiments, the time-series database is a kdb+™ database. In some embodiments, the one or more authentication credentials associated with the remote computing device comprise a username and a password. In some embodiments, validating the one or more authentication credentials associated with the remote computing device comprises overriding one or more functions on the time-series database for interprocess communication calls that are included in the request, and authenticating, by the access control layer, the one or more authentication credentials associated with the remote computing device. In some embodiments, at least one of the one or more interprocess communication calls included in the request comprises a request to open a TCP socket to the time-series database, and wherein the one or more authentication credentials associated with the remote computing device are authenticated using a Winroot lookup.

In some embodiments, the request to access the time-series database is received via a browser on the remote computing device. In some embodiments, validating the one or more authentication credentials associated with the remote computing device comprises capturing information associated with a user logged in to the remote computing device, creating an authentication token to store the captured user information, forwarding the authentication token to the access control layer, and decoding the authentication token to identify the user logged in to the remote computing device. In some embodiments, the access control layer authorizes the remote computing device to access data in the time-series database using the decoded authentication token. In some embodiments, the authentication token is a JSON Web Token. In some embodiments, the JSON web token is forwarded to the access control layer using an HTTP Request.

In some embodiments, capturing information associated with a user logged in to the remote computing device comprises performing a lookup in an identity management system using the one or more authentication credentials associated with the remote computing device to capture the information associated with the user. In some embodiments, the browser transmits the request to access the time-series database to the server computing device based upon detection of interaction with a web link displayed in the browser. In some embodiments, the access control layer of the server computing device prevents the remote computing device from accessing the time-series database when the authorization step fails.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
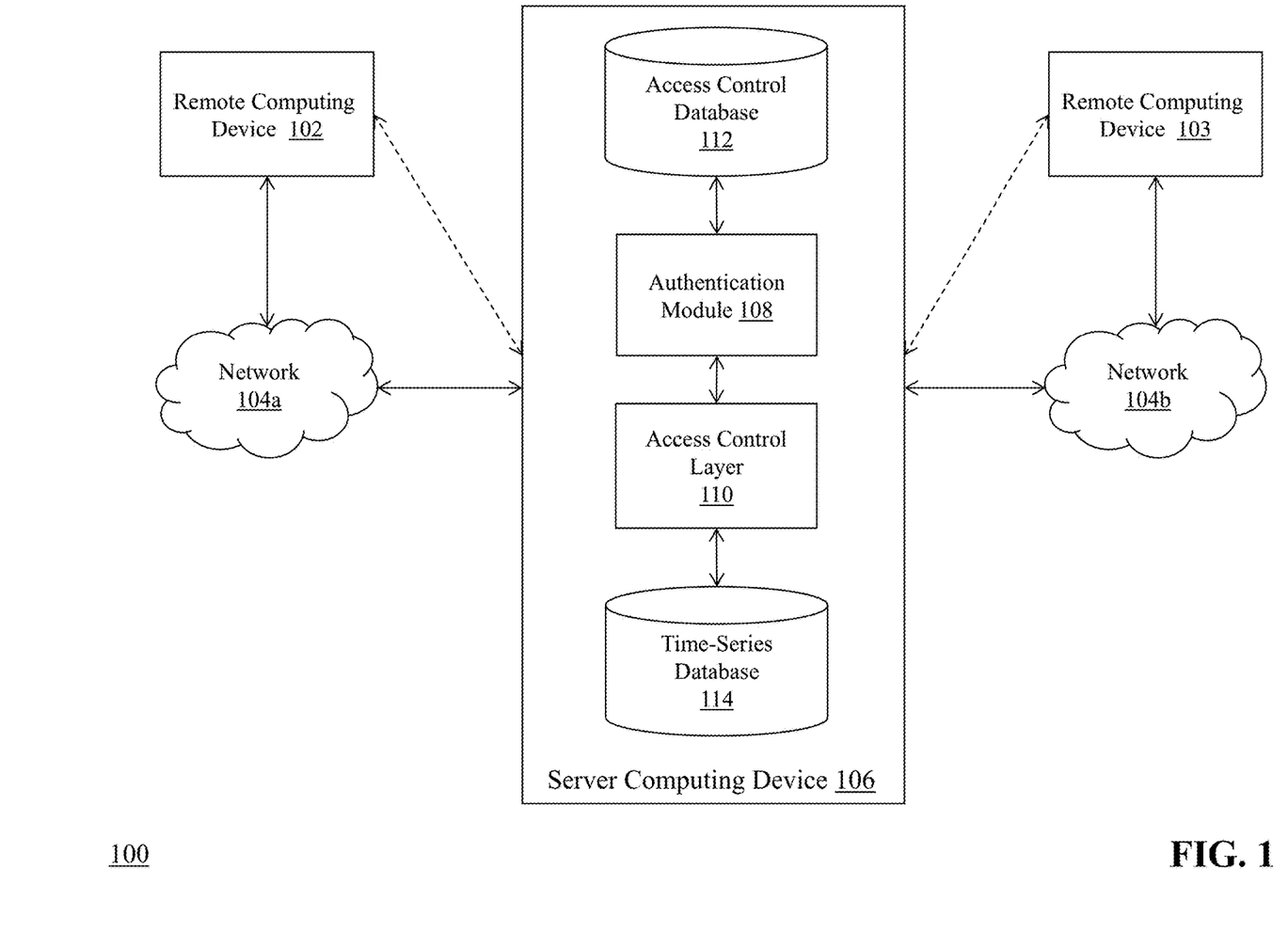
FIG. 1 is a block diagram of a system for time-series database user authentication and access control.

FIG. 1 is a block diagram of a system for time-series database user authentication and access control. The system 100 includes remote computing devices 102, 103, communications networks 104a, 104b, a server computing device 106 that includes an authentication module 108, an access control layer 110, an access control database 112, and a time-series database 114.

The remote computing devices 102, 103 connect to one or more communications networks (e.g., 104a, 104b respectively) in order to communicate with the server computing device 106 to provide input and receive output relating to requesting access to and accessing data within the time-series database 114 as described herein.

Exemplary remote computing devices 102, 103 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of the system 100 can be used without departing from the scope of invention. Although FIG. 1 depicts two remote computing devices 102, 103, it should be appreciated that the system 100 can include any number of remote computing devices.

The communications networks 104a, 104b enable the respective remote computing devices 102, 103 to communicate with the server computing device 106. The networks 104a, 104b are typically wide area networks, such as the Internet and/or a cellular network. In some embodiments, the networks 104a, 104b are comprised of several discrete networks and/or sub-networks (e.g., cellular to Internet). In some embodiments, the networks 104a, 104b can be part of the same overall network topography and/or the remote computing devices 102, 103 can connect to the server computing device 106 using the same network.

The server computing device 106 is a device including specialized hardware and/or software modules that execute on a processor and interact with memory modules of the server computing device 106, to receive data from other components of the system 100, transmit data to other components of the system 100, and perform functions for time-series database user authentication and access control as described herein. The server computing device 106 includes an authentication module 108 and an access control layer 110 that execute on the processor of the server computing device 106. The server computing device 106 also includes an access control database 112 and a time-series database 114. In some embodiments, the access control database 112 is on a separate computing device from the time-series database 114. In some embodiments, the modules 108, 110 are specialized sets of computer software instructions programmed onto one or more dedicated processors in the server computing device.

Although the modules 108, 110 are shown in FIG. 1 as executing within the same server computing device 106, in some embodiments the functionality of the modules 108, 110 can be distributed among one or a plurality of other computing devices that are coupled to the server computing device 106. In addition, in some embodiments the access control database 112 and/or the time-series database 114 can be distributed to one or more separate computing devices that are coupled to the server computing device 106. As shown in FIG. 1, the server computing device 106 enables the modules 108, 110, access control database 112, and time-series database 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110 will be described in greater detail throughout this specification.

The access control database 112 is a computing device (or in some embodiments, a set of computing devices) coupled to the server computing device 106 and is configured to receive, generate, and store specific segments of data relating to the process of time-series database user authentication and access control as described herein. In some embodiments, all or a portion of the access control database 112 can be integrated with the server computing device 106 or be located on a separate computing device or devices. The access control database 112 can comprise one or more databases configured to store portions of data used by the other components of the system 100, as will be described in greater detail below. An exemplary access control database 112 is MySQL™ available from Oracle Corp. of Redwood City, Calif. Another exemplary access control database 112 is kdb+ available from Kx Systems of Palo Alto, Calif.

The time-series database 114 is a database designed to perform fast, low-latency processing of large sets of time-series data in real time. Exemplary time-series databases include, but are not limited to, kdb+™ available from Kx Systems of Palo Alto, Calif.; InfluxDB™ available from InfluxData, and Graphite™ available from graphiteapp.org. It should be appreciated that other types of time-series databases can be used within the scope of the technology described herein.

Figure 2:
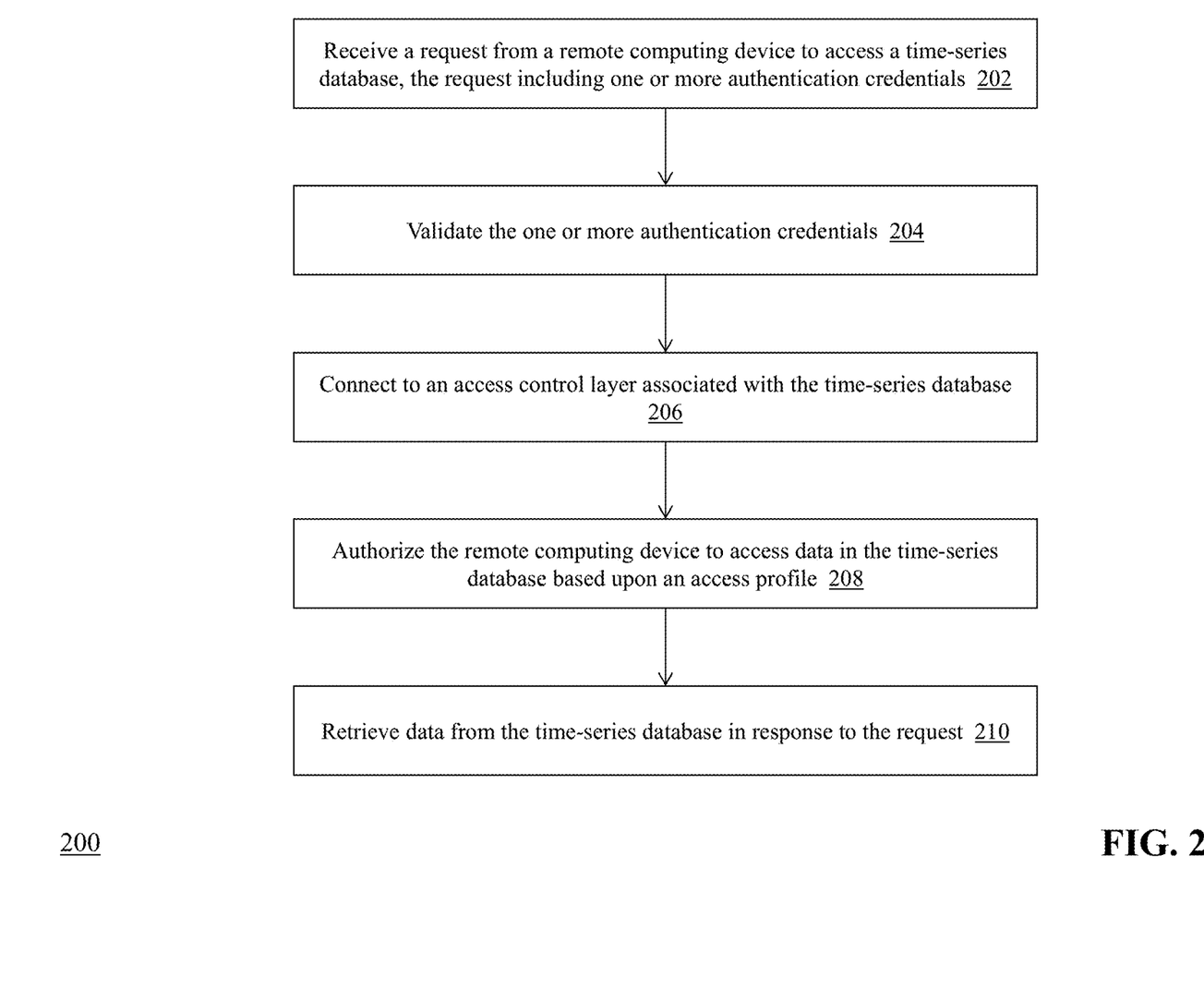
FIG. 2 is a flow diagram of a computerized method of time-series database user authentication and access control.

FIG. 2 is a flow diagram of a computerized method 200 of time-series database user authentication and access control, using the system 100 of FIG. 1. One or more remote computing devices 102, 103 can generate a request to access the time-series database 114 of server computing device. The remote computing devices 102, 103 establish a connection with the server computing device 106 and transmit the access request to the server computing device 106.

The server computing device 106 receives (202) the request from one or more of the remote computing devices 102, 103 to access the time-series database 114. Generally, each request includes one or more authentication credentials associated with the requesting remote computing device. For example, if a user at remote computing device 102 wants to access the time-series database using a web application in a browser, the user may be required to enter authentication credentials (such as a username/password combination) in order to access the functionality of the web application. In some embodiments, the remote computing devices 102, 103 use an identity management system (such as PingAccess™ SSO available from Ping Identity Corp. of Denver, Colo.) for single sign-on to identify the logged-in user and send the identity (e.g., in the form of a web token) as part of the request to server computing device 106. The remote computing device 102 can transmit the authentication credentials entered by the user (or some indicia thereof, such as a user profile, user identification number, security token, etc.) to the server computing device 106 as part of the request. Similarly, if the remote computing device 103 is hosting an application (e.g., C++, Java™) that desires access to the time-series database, the remote computing device 103 can transmit authentication credentials associated with the remote computing device 103—such as key-exchange pairs, service account/password information, etc.—as part of the request. In some embodiments, the remote computing device 102, 103 can establish a secure connection and session with the server computing device 106 as part of the access request and thus transmit the authentication credentials once during the session. In some embodiments, the remote computing device 102, 103 transmits the authentication credentials as part of each access request—even during the same session. It should be appreciated that other types and mechanisms of authentication credentials can be used within the scope of technology described herein.

Figure 3:
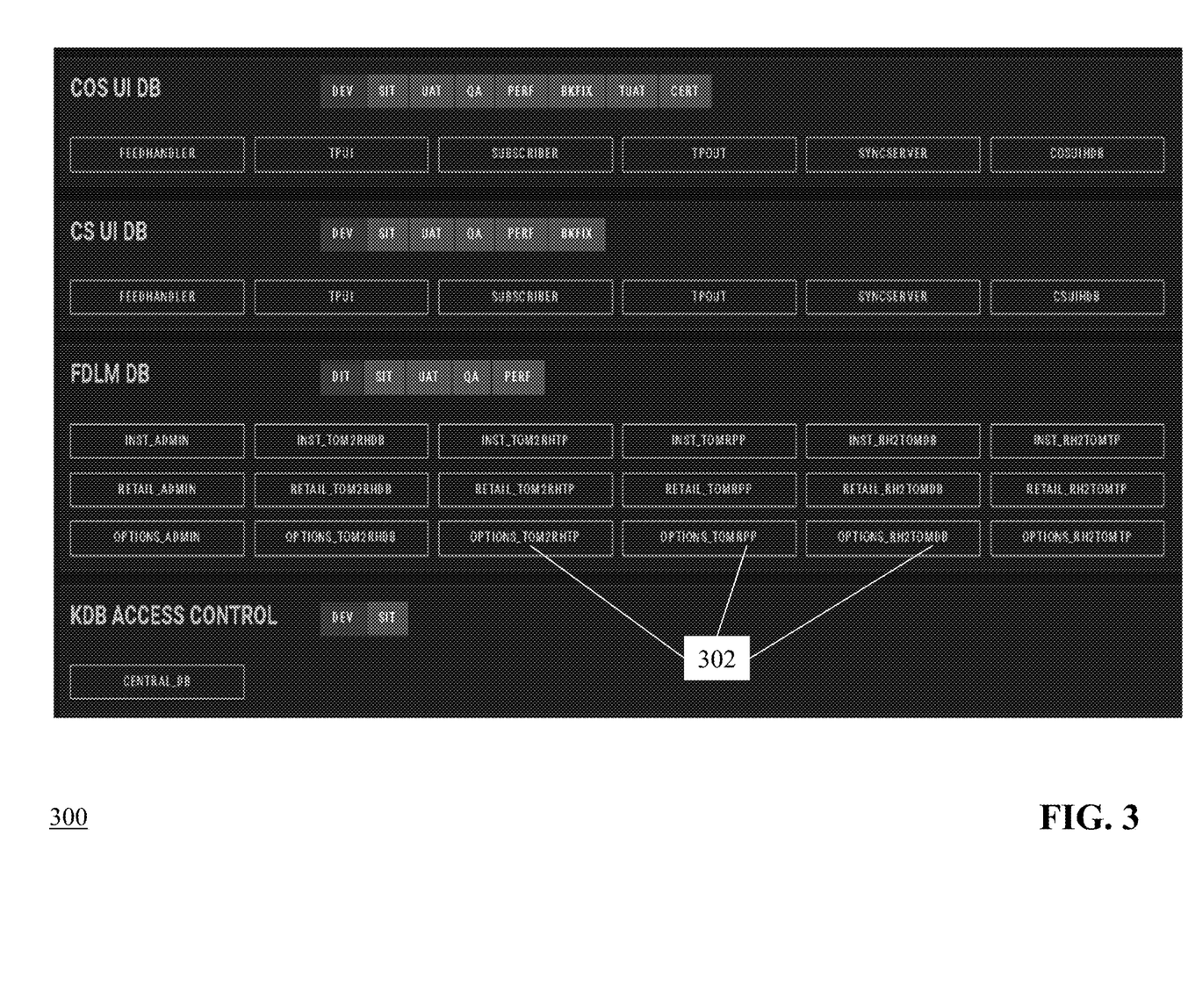
FIG. 3 is a diagram of an exemplary interface for generating an access request to a time-series database.

The authentication module 108 of server computing device 106 receives the access request and one or more authentication credentials from the remote computing device 102, 103, and the authentication module 108 validates (204) the one or more authentication credentials. For example, remote computing device 102 can be a client device at which a user is seeking access to the time-series database through a browser interface—the user can click a link in the browser to generate and transmit the access request to the server computing device 106. An exemplary user interface 300 for accessing the time-series database is shown in FIG. 3. As shown, the user interface 300 includes one or more links (e.g., buttons 302) that refer to specific database features of the time-series database 114. Clicking on one of these links initiates a request to access the time-series database that is transmitted from, e.g., remote computing device 102 through network 104*a* to server computing device 106. The web application user interface 300 that contains the link to time series database 114 uses, in some embodiments, an identity management system like Ping Access™ SSO to identify the logged-in user, and generate and send user credentials in the form of, e.g., a web token to the authentication module 108 as part of the HTTP request.

The authentication module 108 receives the request and associated authentication credentials, and validates the authentication credentials. In this example, the authentication module 108 captures information associated with the user logged in to the remote computing device 102 by, e.g., using an identity management system (such as performing a lookup) using the one or more authentication credentials associated with the remote computing device 102. An exemplary identity management system that can be used by the authentication module 108 is PingAccess™ SSO available from Ping Identity.

Upon receiving the information elements associated with the user identity (e.g., via an authentication token, such as a JSON Web Token), the authentication module 108 decodes the token to authenticate the logged-in user. After authentication, the authentication module 108 forwards the request to access control layer 110 of server computing device 106 to lookup the user access against the access control database as part of authorization of the user's access to the time-series database 114, as will be described in greater detail below.

In another example, as mentioned above the remote computing device 103 can be an application server that hosts and executes an external software application (e.g., C++, Java™) that accesses the time-series database 114. The authentication module 108 receives the request and associated authentication credentials, and validates the authentication credentials. In this example, the authentication module 108 overrides one or more interprocess communication (IPC) calls to the time-series database that are included in the request. For example, the remote computing device 103 may include or trigger IPC calls to the time-series database 114 in the access request and/or the server computing device 106, upon receiving the access request, may initiate IPC calls upon receiving the access request. The authentication module 108 can override these IPC calls before the calls reach the time-series database 114, in order to validate the authentication credentials.

In some embodiments, at least one of the IPC calls comprises a request to open a TCP socket to the time-series database 114. The authentication module 108 overrides the TCP socket open request and validates the authentication credentials by, e.g., accessing Winroot to look up and confirm a valid userid/password combination.

When the authentication credentials have been validated, the authentication module 108 connects (206) to the access control layer 110, which controls user-specific and data-specific access to the time-series database 114 and authorizes (208) the remote computing device 102, 103 to access data in the time-series database 114. Continuing with the above example, after the authentication module 108 validates the authentication credentials received from remote computing device 102 (i.e., by performing an identity management system lookup and generating the JSON Web Token), the authentication module 108 forwards the JSON Web Token to the access control layer 110. For example, the access control database 112 can store one or more access profiles that define one or more specific segments of data in the time-series database to which the user has access. The access control layer 110 can retrieve the access profiles associated with the validated user and determine whether the request to access the time-series database 114 (including the particular data segments to which access is requested) comply with the information defined in the one or more access profiles. In some embodiments, the access profiles relate to the specific user-access profiles can also relate to a role or characteristic (e.g., job role, job title, business unit, etc.) associated with the user, and access profiles can also relate to an enterprise as a whole (such as corporate access policies and the like). The access control layer 110 can evaluate the access profiles that pertain to the user—including the resolution of any conflicts in access permissions—in order to determine whether the user is (i) authorized to access the time-series database altogether and (ii) authorized to access the specific segments of data requested. Upon determining that the user is authorized, the access control layer 110 retrieves (210) data from the time-series database 114 in response to the request, and transmits the requested data to the remote computing device 102.

Figure 4:
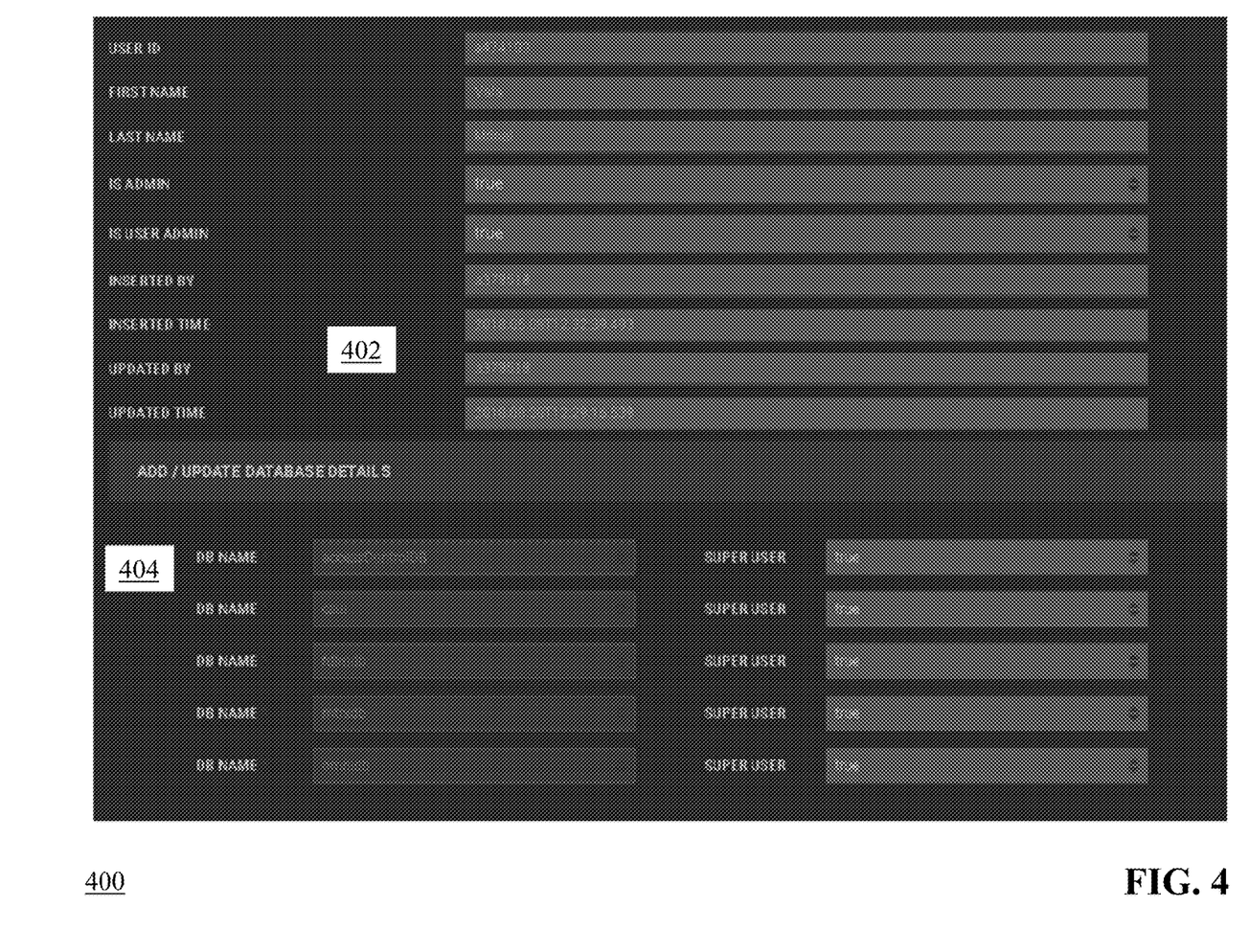
FIG. 4 is a diagram of an exemplary interface for configuring an access profile for a time-series database.

FIG. 4 is a diagram of an exemplary user interface 400 for configuring an access profile of a user for a time-series database. As shown in FIG. 4, the access profile can comprise user-specific information 402, such as data identifying the user (e.g., User ID, first name, last name), data associated with the user's access permissions (e.g., Is Admin), and so forth. The access profile can also include database-specific information 404, such as particular database names that the user can access and the type of access granted to the user (e.g. Super User).

Continuing with the other above example, after the authentication module 108 validates the authentication credentials received from remote computing device 103 (i.e., by performing a Winroot lookup), the authentication module 108 forwards the authentication credentials (or indicia thereof) to the access control layer 110, which authorizes the remote computing device 103 to access data in the time-series database 114 by, e.g., determining an access profile associated with the validated authentication credentials. Similar to the above process, the access control layer 110 can retrieve access profiles associated with the validated remote computing device 103 from, e.g., access control database 112, and determine whether the request to access the time-series database 114 (including the particular data segments to which access is requested) comply with the information defined in the one or more access profiles. Upon determining that the remote computing device 103 is authorized, the access control layer 110 retrieves (210) data from the time-series database 114 in response to the request, and transmits the requested data to the remote computing device 103.

In some embodiments, the access profiles can comprise an AccessClass that includes a list of valid database commands that are allowed to be executed when specific users or devices access the time-series database 114. For example, the AccessClass can include multiple sets of commands:

Allowed Commands—this is a list of commands that the user/device is allowed to execute against the time-series database at any time;

Restricted Commands—this is a list of commands that the user/device is allowed to execute against the time-series database during a specifically-defined time window;

In some embodiments, the AccessClass can define a list of commands that the user/device is not able to execute, or the fact that a specific command is not in either of the above lists can indicate that the user/device cannot execute the command.

Figure 5:
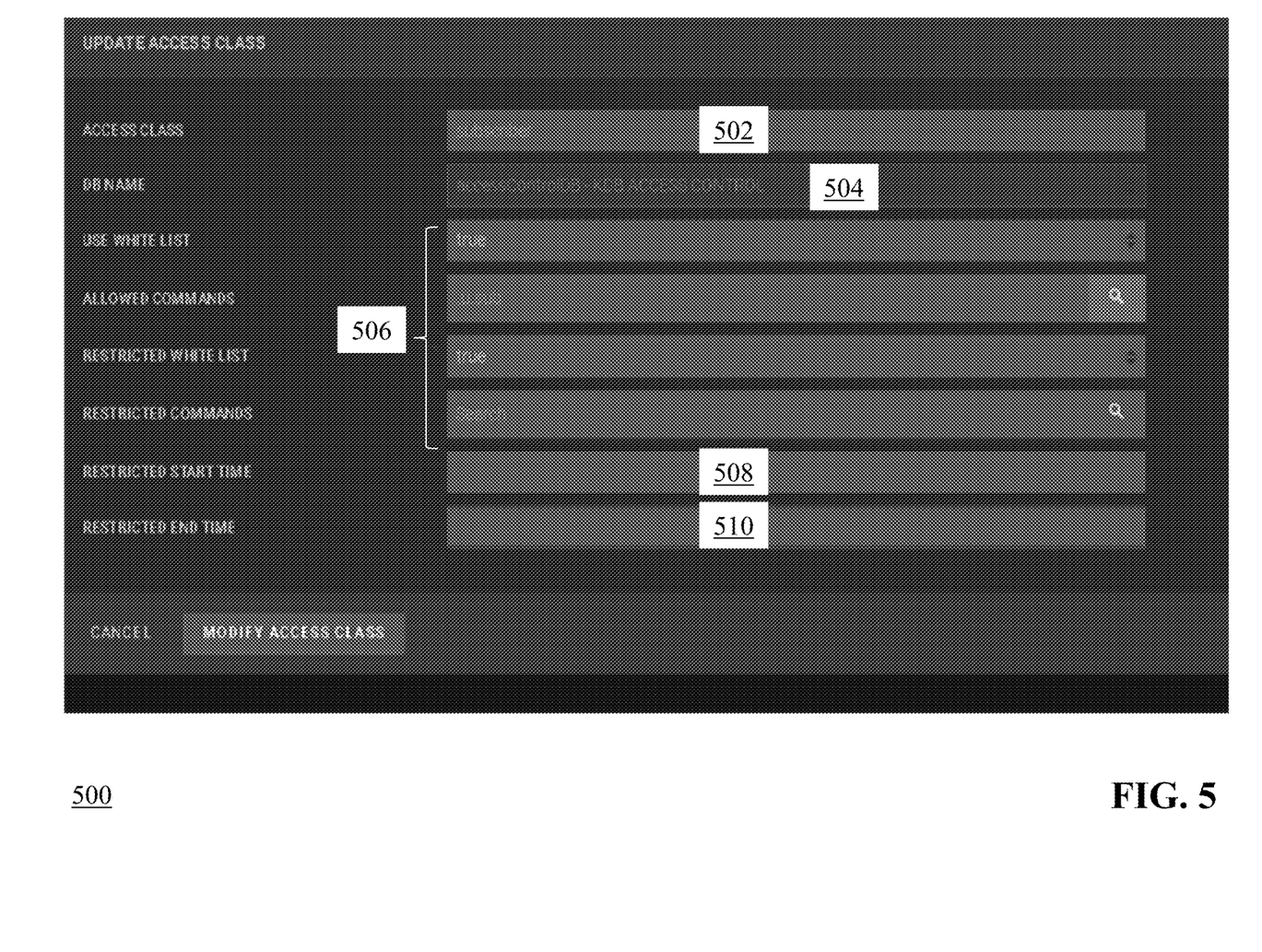
FIG. 5 is a diagram of an exemplary interface for configuring an AccessClass for a time-series database.

FIG. 5 is a diagram of an exemplary interface 500 for configuring an AccessClass for a time-series database. As shown in FIG. 5, the interface 500 can include an AccessClass name 502, a database name 504, along with specific white lists and/or commands 506 that are allowed or restricted for the given AccessClass. The interface 500 also includes a start time 508 and end time 510 for the particular restricted commands (as noted previously).

In either example noted above, it should be appreciated that the access control layer 110 can prevent the remote computing device 102, 103 from accessing data in the time-series database 114 (or from accessing the time-series database 114 altogether) when the authorization step fails. For example, if the access request contains a request for data from a specific data record or table in the time-series database 114 and the associated user or remote computing device is not associated with an access profile that is authorized to access that data record or table, the access control layer 112 can refuse the access request and notify the remote computing device 102, 103 that access is denied.

In some embodiments, the access control layer 110 establishes a connection to the time-series database 114 upon startup and maintains the connection through many different access requests received from various remote computing devices 102, 103. In this way, the access control layer 110 does not need to authenticate itself to the time-series database 114 for each access request—thereby ensuring the efficient, fast data retrieval and not unduly burdening the time-series database 114 with unnecessary authentication processing, which could hamper the performance of the time-series database 114. Because the access control layer 110 and authentication module 108 take care of validating incoming access requests and ensuring proper authorization to access data, the time-series database 114 does not suffer from increased processing times or delayed data retrieval. Also, in some embodiments, once a remote computing device 102, 103 has been validated and authorized by the system 100 as described herein, the remote computing device 102, 103 does not need to re-authenticate for each new access request submitted during the same communication session with the server computing device 106 (or in other embodiments, only needs to periodically refresh the authentication during the same communication session). This also provides the advantage of faster, more streamlined data access.

In addition to the above, the authentication module 108 and/or the access control layer 110 can be further configured to capture information associated with each connection opened to the time-series database 114, and log the captured information in, e.g., access control database 112. For example, the authentication module 108 and/or access control layer 110 can log all userids, login attempts, login times, status of login attempts (e.g., approved, denied), and so forth. The authentication module 108 and/or access control layer 110 can also log all activity and commands/actions performed by individual users or remote computing devices 102, 103. In this way, the authentication module 108 and/or access control layer 110 can generate an audit trail relating to access of the time-series database 114 for analysis and monitoring of the authentication and access control process.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for time-series database user authentication and access control, the system comprising:

a server computing device comprising a memory for storing computer-executable instructions and a processor that executes the computer-executable instructions to:
  receive a request from a remote computing device to access a kdb+™ database coupled to the server computing device, wherein the request includes one or more authentication credentials associated with the remote computing device;
  connect to an access control layer associated with the kdb+™ database;
  override one or more functions on the kdb+™ database for interprocess communication calls that are included in the request;
  validate, by the access control layer, the one or more authentication credentials associated with the remote computing device;
  authorize, by the access control layer, the remote computing device to access data in the kdb+™ database based upon an access profile associated with the validated authentication credentials; and
  retrieve data from the kdb+™ database in response to the request.

2. The system of claim 1, wherein the one or more authentication credentials associated with the remote computing device comprise a username and a password.

3. The system of claim 1, wherein at least one of the one or more interprocess communication calls included in the request comprises a request to open a TCP socket to the kdb+™ database, and wherein the one or more authentication credentials associated with the remote computing device are authenticated using a Winroot lookup.

4. The system of claim 1, wherein the request to access the kdb+™ database is received via a browser on the remote computing device.

5. The system of claim 4, wherein validating the one or more authentication credentials associated with the remote computing device comprises:
  capturing information associated with a user logged in to the remote computing device;
  creating an authentication token to store the captured user information as part of a web interface to access the kdb+™ database;
  forwarding the authentication token to the access control layer, the access control layer comprising an authentication module; and
  decoding, by the authentication module, the authentication token to identify the user logged in to the remote computing device.

6. The system of claim 5, wherein the access control layer authorizes the remote computing device to access data in the kdb+™ database using the authentication token decoded by the authentication module.

7. The system of claim 5, wherein the authentication token is a JSON Web Token.

8. The system of claim 7, wherein the JSON web token is forwarded to the authentication module using an HTTP Request.

9. The system of claim 5, wherein capturing information associated with a user logged in to the remote computing device comprises performing a lookup in an identity management system using the one or more authentication credentials associated with the remote computing device to capture the information associated with the user.

10. The system of claim 4, wherein the browser transmits the request to access the kdb+™ database to the server computing device based upon detection of interaction with a web link displayed in the browser.

11. The system of claim 1, wherein the access control layer of the server computing device prevents the remote computing device from accessing the kdb+™ database when the authorization step fails.

12. A computerized method of time-series database user authentication and access control, the method comprising:
  receiving a request from a remote computing device, to access a kdb+™ database coupled to the server computing device, wherein the request includes one or more authentication credentials associated with the remote computing device;
  connecting to an access control layer associated with the kdb+™ database;
  overriding one or more functions on the kdb+™ database for interprocess communication calls that are included in the request;
  validating, by the access control layer, the one or more authentication credentials associated with the remote computing device;
  authorizing, by the access control layer, the remote computing device to access data in the kdb+™ database based upon an access profile associated with the validated authentication credentials; and
  retrieving data from the kdb+™ database in response to the request.

13. The method of claim 12, wherein the one or more authentication credentials associated with the remote computing device comprise a username and a password.

14. The method of claim 12, wherein at least one of the one or more interprocess communication calls included in the request comprises a request to open a TCP socket to the kdb+™ database, and wherein the one or more authentication credentials associated with the remote computing device are authenticated using a Winroot lookup.

15. The method of claim 12, wherein the request to access the kdb+™ database is received via a browser on the remote computing device.

16. The method of claim 15, wherein validating the one or more authentication credentials associated with the remote computing device comprises:
  capturing information associated with a user logged in to the remote computing device;
  creating an authentication token to store the captured user information as part of a web interface to access the kdb+™ database;
  forwarding the authentication token to the access control layer, the access control layer comprising an authentication module; and
  decoding, by the authentication module, the authentication token to identify the user logged in to the remote computing device.

17. The method of claim 16, wherein the access control layer authorizes the remote computing device to access data in the kdb+™ database using the authentication token decoded by the authentication module.

18. The method of claim 16, wherein the authentication token is a JSON Web Token.

19. The method of claim 18, wherein the JSON web token is forwarded to the authentication module using an HTTP Request.

20. The method of claim 16, wherein capturing information associated with a user logged in to the remote computing device comprises performing a lookup in an identity management system using the one or more authentication credentials associated with the remote computing device to capture the information associated with the user.

21. The method of claim 15, wherein the browser transmits the request to access the kdb+™ database to the server computing device based upon detection of interaction with a web link displayed in the browser.

22. The method of claim 12, wherein the access control layer of the server computing device prevents the remote computing device from accessing the kdb+™ database when the authorization step fails.

* * * * *